United States Patent [19]

Feichtinger et al.

[11] 4,072,659
[45] Feb. 7, 1978

[54] 4,4'-THIO-BIS-(DIALKYLPHENOL)/FORMALDEHYDE CONDENSATES AND PROCESS FOR PRODUCING THEM

[75] Inventors: Hans Feichtinger, Dinslaken; Siegfried Lutze, Gelsenkirchen; Hans-Walter Birnkraut, Oberhausen; Werner Kluy, Bochum-Stiepel, all of Germany

[73] Assignee: Ruhrchemie AG, Oberhausen, Germany

[21] Appl. No.: 574,811

[22] Filed: May 5, 1975

[30] Foreign Application Priority Data

May 17, 1974 Germany .............................. 2424201

[51] Int. Cl.$^2$ ............................................. C08G 8/12
[52] U.S. Cl. ............................. 260/57 A; 260/45.75; 260/45.95 R; 260/45.95 C; 260/48; 260/51 R; 260/57 R; 260/848
[58] Field of Search ............. 260/48, 51 R, 848, 57 R, 260/57 A, 45.95 R, 45.95 C, 45.75

[56] References Cited

U.S. PATENT DOCUMENTS

| | | | |
|---|---|---|---|
| 3,057,926 | 10/1962 | Coffield | 260/45.95 C |
| 3,119,783 | 1/1964 | Baum | 260/848 |
| 3,248,357 | 4/1966 | Yurcick et al. | 260/48 |
| 3,250,712 | 5/1966 | Coffield | 260/45.95 C |
| 3,370,036 | 2/1968 | Martinovich | 260/45.95 C |
| 3,392,141 | 7/1968 | Blumberg | 260/848 |
| 3,398,116 | 8/1968 | Giolito | 260/45.95 C |
| 3,707,565 | 12/1972 | Hofer | 260/45.95 C |
| 3,986,981 | 10/1976 | Lyons | 260/48 |

FOREIGN PATENT DOCUMENTS

1,102,557   7/1968   United Kingdom .................. 260/48

OTHER PUBLICATIONS

Chem. Absts. 81:121646w, Bair et al., "Chemical and Physical Depletion of an Antioxidant from Polyethylene at Low Temp".
Chem. Absts. 81:64678g, Yoshiura et al., "Stabilized Polyolefin Compositions".
Chem. Absts. 84:45240d, Feichtinger et al., "4,4'-Thio-bis-(dialkylphenol)-Formaldehyde".

*Primary Examiner*—Edward M. Woodberry
*Attorney, Agent, or Firm*—Burgess, Dinklage & Sprung

[57] ABSTRACT

A phenol/formaldehyde condensation product of a 4,4'-thio-bis-(dialkylphenol) and formaldehyde having a molecular weight of 1,000 to 4,000; a process for preparing such a condensation product by contacting 4,4'-thio-bis-(dialkylphenol) and a source of formaldehyde in the presence of a protonic acid catalyst; and the use of such a condensation product as an antioxidant in an olefin polymer or copolymer composition.

13 Claims, 1 Drawing Figure

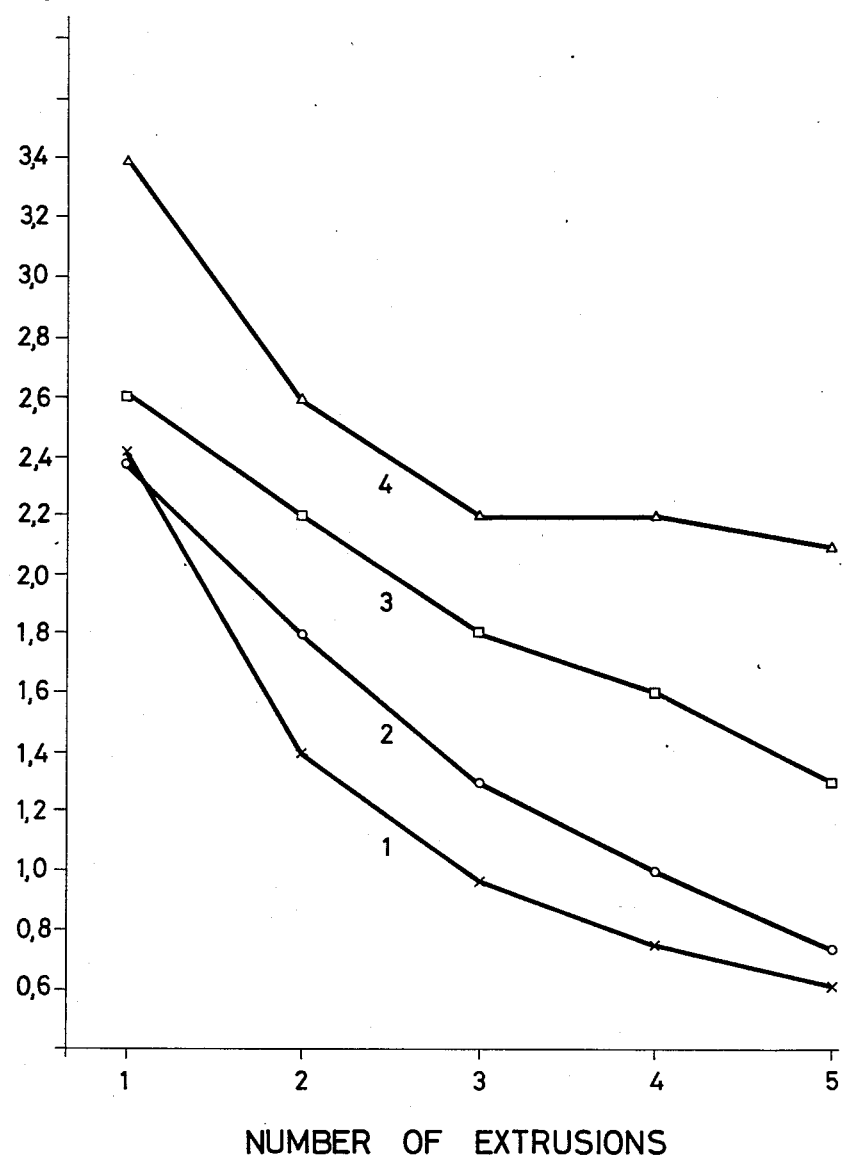

4,4'-THIO-BIS-(DIALKYLPHENOL)/FORMALDEHYDE CONDENSATES AND PROCESS FOR PRODUCING THEM

BACKGROUND OF THE INVENTION

1. Field of the Invention

This invention relates to the preparation of bis-phenol type/formaldehyde condensation products and especially a 4,4'-thio-bis-(dialkylphenol)/formaldehyde condensation products having a molecular weight of between 1,000 and 4,000 and the use of the condensation product as an antioxidant in olefin polymeric or copolymeric compositions. This invention is particularly directed to the condensation products themselves.

2. Discussion of the Prior Art

It is known that phenol and its partially substituted derivatives react with carbonyl compounds to form higher molecular weight condensation products having non-uniform structure. However, under specific reaction conditions or with particular carbonyl compounds, there are also obtained low molecular weight condensation products. It has become desirable to provide higher molecular weight products obtained by the condensation of formaldehyde or a source of formaldehyde and a substituted phenolic compound. More especially it has become desirable to provide such a condensation product which is compatible with olefin polymeric or copolymeric compositions to impart to such compositions antioxidant properties.

Accordingly, it is an object of the present invention to provide a process for the production of alkyl-substituted bis-phenolic/formaldehyde condensates having higher molecular weights, say, in the region of 1,000 to 4,000 which are compatible with olefinic polymers or copolymers so as to function in such compositions as antioxidants, albeit present in small quantities.

SUMMARY OF THE INVENTION

In accordance with this invention there is provided a 4,4'-thio-bis-(dialkylphenol)/formaldehyde condensation product, especially a condensation product having a molecular weight of 1,000 to 4,000. In accordance with this invention there is also provided a process for the production of such a condensation product having a molecular weight of 1,000 to 4,000 which process comprises contacting a 4,4'-thio-bis-(dialkylphenol) having a free hydrogen atom in an ortho position with respect to each phenolic hydroxyl group with formaldehyde in the presence of a protonic acid, as catalyst. Generally speaking, the process can be conducted, if desired, in the presence of a solvent although a solvent is not required. The mole ratio of the 4,4'-thio-bis-(dialkylphenol) to formaldehyde was generally in the range of 1:0.5 to 10 and the mole ratio of the 4,4'-thio-bis-(dialkylphenol) to protonic acid catalyst is in the range of 1:0.01 to 10.

In accordance with this invention there is provided a phenol/formaldehyde condensation product having a repeating unit of the formula

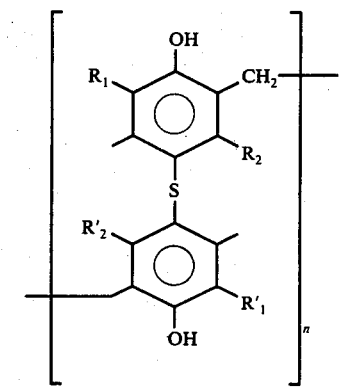

or one having a repeating unit of the formula

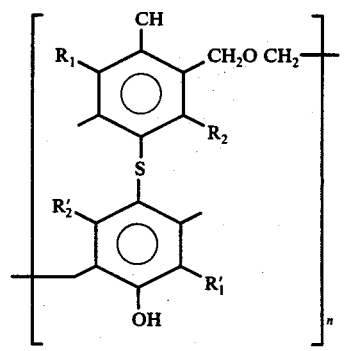

wherein $n$ is 3 to 12 $R_1$ and $R'_1$ are each independently selected from the group consisting of straight chained alkyl of 1-8 carbon atoms, branched chained alkyl of 1-8 carbon atoms, $R_2$ and $R'_2$ are each independently hydrogen, straight chained alkyl of 1-8 carbon atoms and branched chained alkyl of 1-8 carbon atoms. Generally speaking, the molecular weight of the condensation product is between 1,000 and 4,000, preferably between 1000 and 2000, the molecular weight being determined by vapor pressure osmometer and K. Rast-Method.

Generally speaking, the 4,4'-thio-bis-(dialkylphenol)/formaldehyde condensation products are obtained by employing a 4,4'-thio-bis-(dialkylphenol) which has the general formula

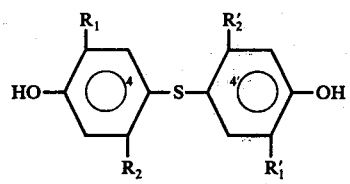

wherein $R_1$ and $R'_1$ are straight chained alkyl groups of 1-8 carbon atoms or branched chained alkyl groups of 1-8 carbon atoms or branched chained alkyl groups of 1-8 carbon atoms and $R_2$ and $R'_2$ are hydrogen, straight-chained alkyl groups of 1-8 carbon atoms or branched chained alkyl groups having 1-8 carbon atoms. Examples of these compounds include 4,4'-thio-bis-(3-methyl-6-t-butylphenol), 4,4'-thio-bis-(3-isopropyl-6-t-butylphenol), 4,4'-thio-bis-(3,6-di-t-butylphenol), 4,4'-thio-bis-(3-methyl-6-isopropylphenol), 4,4'-thio-bis-(3-propyl-6-t-butylphenol), 4,4'-thio-bis-(3-isopropyl-6-isoamyl-phenol) and 4,4'-thio-bis-(6-t-butyl-phenol). Thus, in the preferred embodiment of the present invention $R_1$ and $R'_1$ are branched chained alkyl groups having up to 8 carbon atoms, especially having 1-4 carbon atoms. However, it is also possible to employ asymmetric bisphenols in the process of the invention.

In the process of the present invention a bisphenol having a free hydrogen atom in the ortho position with respect to each phenolic hydroxy group is employed. It is believed that it is this hydrogen which influences the reactivity of the hydroxyl group and thus allows for the preparation of polymers having either or both of the structural units depicted above.

In conducting the process a source of formaldehyde is employed. While the source of formaldehyde is in many instances preferably an aqueous solution of formaldehyde such as one containing 30 to 40% by weight HCHO, e.g., a formalin solution, any monomeric or polymeric source of formaldehyde is suitable. Thus the process can be conducted employing paraformaldehyde as a formaldehyde source.

Various inorganic or organic protonic acids can be used as catalysts for the bisphenol-formaldehyde reaction. Preferably, the protonic acid catalyst is one from the group consisting of hydrochloric acid, phosphoric acid, p-toluene sulfonic acid and mixtures of hydrochloric acid with oxalic acid, sulfuric acid or boric acid. The use of mixtures containing oxalic acid has been found to be particularly useful owing to the reducing properties of the oxalic acid which provide condensation products having a particularly bright and desirable color. The mole ratio of the 4,4'-thio-bis-(dialkylphenol) to protonic acid is generally in the range of 1:0.01 to 10, preferably 1:0.1 to 1.

It is considered particularly surprising that high molecular weight materials of the order of 1,000 to 4,000 are provided by the use of 4,4'-thio-bis-(dialkylphenol) inasmuch as the reactant, especially when one of the alkyl groups is a tertiary or branched alkyl group, is stearically hindered due to the presence of the alkyl groups adjacent the phenol hydroxy groups. A reduction in their reactivity would have been expected.

DESCRIPTION OF SPECIFIC EMBODIMENTS

The reaction of formaldehyde with the sulfur-containing bisphenols which is carried out especially with molar ratios of 1:0.8 to 1:3.0 can be effected in an extremely simple manner. Depending upon the selected reaction parameters, i.e., the amount of protonic acid charged and/or the ratio of 4,4'-thio-bis-(dialkylphenol) to formaldehyde, the molecular weight can be controlled within the limits of about 1,000 to 4,000.

Under otherwise identical reaction conditions, the molecular weight of the reaction products increases as the amount of catalyst and/or the amount of formaldehyde are increased.

Preferably the condensation reaction is carried out in the presence of a solvent. Particularly suitable solvents are aliphatic, aromatic or cycloaliphatic hydrocarbons having boiling points between about 70° and 150° C. Particularly contemplated solvents include the following: Benzene, toluene and a mixture of hydrogenated aliphatic hydrocarbons in the boiling range from 140 to 170° C., called "Esso-Varsol".

If the reaction is carried out at 70° C, it is completed after about 4 hours and at 100° C it is completed after as little as 15 minutes. Generally speaking, the reaction is conducted at a temperature between 50° and 150° C, preferably between 70° and 100° C for between 15° and 240 minutes.

The products are prepared with the use of different solvents and while maintaining various temperatures and reaction periods do not differ in their physical properties. For example, when using 4,4'-thio-bis-(3-methyl-6-t-butylphenol) as the starting bisphenol, the hydroxyl numbers of the 4,4'-thio-bis-(dialkylphenol)/formaldehyde condensates range between 289 and 305.

The following general structures can be derived herefrom for the low-molecular units:

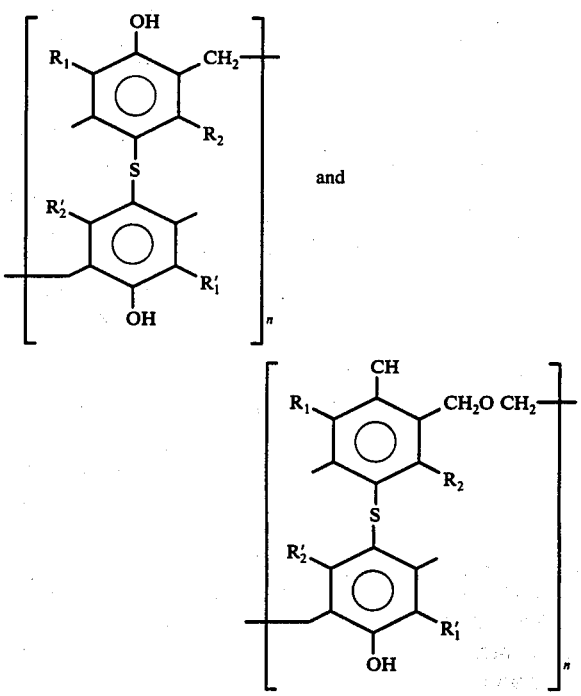

In these formulas, the substituents $R_1$, $R_2$ and $R'_1$ and $R'_2$ have the meaning mentioned above. The bridge links between the thio-bis-phenol units are methylene or dimethylene ether groups. The presence of both groups could be detected in the IR spectrum.

The compounds which are obtainable by the process according to the invention are outstanding antioxidants for plastic materials. Polymers of various constitutions, e.g., polyolefins, are subject to serious deterioration by thermal autoxidation and oxidative photodegradation. Degradation by oxidation occurs especially at higher temperatures and results in embrittlement and crazing or cracking at the surface of the material. The degradation of polymers is counteracted by the use of antioxidants among which 4,4'-thio-bis-(3-methyl-6-t-butyl-phenol) has found particularly wide application. For several applications of this bisphenol, its relatively high vapor pressure is disadvantageous. It has the result that, as elevated temperatures such as those which may occur during processing of the material mixed with the bisphenol, all or part of the stabilizer is evaporated so that its protective action is lost or reduced. Additionally, the migrated or exuded stabilizer may deposit in the processing machines resulting in troubles in the processing and fabricating procedure.

As disclosed in U.S. Pat. No. 3,247,262, less volatile antioxidants can be prepared by oxidative coupling of monophenols containing unsubstituted hydrogen atoms in ortho or para position with respect to the phenolic hydroxyl group with cupric salts of organic acids. However, due to the low molecular weight of the starting phenols, the compounds obtained show only slightly improved vapor pressure properties.

According to German Offenlegungsschrift No. 1,793,192 compounds having higher molecular weights are obtained by oxidative coupling of sulfur-containing bisphenols which contain unsubstituted hydrogen in o-position. This process furnishes products having molecular weights which do not exceed about 1,000 and containing less than 75% of the phenolic hydroxy groups contained in the starting compounds.

While the stability in processing of plastic materials in which these compounds are incorporated as antioxidants is somewhat improved, it is not sufficient in all cases. This behavior is probably due to the reaction in the number of hydroxy groups as compared with that of the starting compounds.

In addition to the higher molecular weight, the products prepared by the new process differ from the substances obtained by oxidative coupling advantageously by the fact that the phenolic hydroxy groups are preserved and the ratio of bridge sulfur atoms to phenolic hydroxy groups is not altered. This ratio is of particular importance for the activity as antioxidant. The novel compounds are useful as antioxidants for any plastic materials and are preferably used for stabilizing polyolefins, especially polyethylene. Additionally, they may be used to prevent cross linking which, for example, has very disadvantageous consequences in film production and, due to inhomogeneities, may result in rupture of the extruded film. They are usually incorporated in the plastic materials in amounts of 0.01 to 1.0% by weight based on the weight of the polymer.

The products according to the invention can be used not only alone as difficultly migrating antioxidants but also in combination with further stabilizers, lubricants and antiblocking agents, UV absorbers and other additives. The production of the novel compounds and their use as stabilizers are illustrated by the following examples.

In order to more fully illustrate the nature of the invention and the manner of practicing the same the following examples are presented:

EXAMPLE 1

Into a four-necked flask equipped with a Teflon stirrer, reflux condenser, thermometer and dropping funnel and having a capacity of 2 liters were charged 500 ml benzene which was heated at 80° C to mild boiling. Then 179 g 4,4'-thio-bis-(3-methyl-6-t-butylphenol) were dissolved in the benzene. To this solution was added through the dropping funnel within 30 minutes a mixture of 37.5 g of a 32% formalin solution, 29.0 g of 32% hydrochloric acid and 1.8 g oxalic acid. The oxalic acid served to brighten the condensates, its presence being not absolutely necessary.

The reaction mixture was refluxed for about 4 to 5 hours at 72° to 75° C while vigorously stirring. Upon completion of the reaction, the hydrochloric acid was removed in the same reaction vessel by washing several times with distilled water. The lower phase containing hydrochloric acid can be conveniently drained through a drain valve attached to the bottom. Thereafter the solvent was evaporated under vacuum. 181 grams of a faintly yellowish resin having a molecular weight of 1030 and a hydroxyl number of 350 remained as the residue.

EXAMPLE 2

By the procedure of Example 1, 179 g 4,4'-thio-bis-(3-methyl-6-t-butylphenol) and 37.5 g of a 32% formalin solution were reacted under the same reaction conditions but with 58.0 g of a 32% hydrochloric acid. After processing, 185 g of a yellow colored resin having a molecular weight of 1590 and a hydroxyl number of 301 were obtained.

EXAMPLE 3

Following the procedure of Example 1, 179 g of 4,4'-thio-bis-(3-methyl-6-t-butylphenol) and 37.5 g of a 32% formalin solution were reacted with 29.0 g of 32% hydrochloric acid. Deviating from the apparatus described in Example 1, a separator for azeotropically separating the water produced in the reaction was inserted between the reflux condenser and reaction vessel. After 4 hours of reaction, 55 ml water had separated. After usual processing and evaporation of the solvent, 182 g of a yellow brown colored resin having a molecular weight of 2,030 and a hydroxyl number of 298 were obtained.

EXAMPLE 4

179 grams 4,4'-thio-bis-(3-methyl-6-t-butylphenol) were reacted under the conditions of Example 1 with the same amounts of a formaldehyde except that 500 ml of a mixture of aliphatic hydrocarbons boiling at 150° C were used as the solvent in place of benzene. Due to the higher reaction temperature of 100° C, the reaction began immediately and the formaldehyde was reacted already after 30 minutes. After processing, a yellow brown colored resin having a molecular weight of 1,240 and a hydroxyl number of 284 was obtained.

EXAMPLE 5

The efficiency of the novel compounds as stabilizers was determined as follows: The melt viscosity (MFI 190/5 according to DIN 53 735) of polyethylene having a molecular weight of about 80,000 and having incorporated the condensation product of 4,4'-thio-bis-(3-methyl-6-t-butylphenol) and formaldehyde was measured. An electrically heated Zwick capillary plastometer 4104 was used for the measurements. 4 grams of granules containing 0.0875% stabilizer were introduced into the test cylinder. After a fusion period of 4 minutes, the piston having been inserted was loaded with a 5 kgs weight. After an initial travel of the piston for 1 minute, the first $i_5$ value was determined. Thereafter, one waited (about 20 to 30 minutes depending upon the $i_5$ value) until the remainder of the test specimen was extruded through the orifice under the same load. After having cleaned the piston, the test cylinder and the orifice, the extruded test specimen having been cut into pieces of 3 cm. length was introduced again and the next measurement made in the manner described above. This procedure was effected five times on the same test specimen. The test temperature was 240° C.

In the graph attached hereto, the dependence of the melt viscosity (MFI 190/5) on the number of extrusions in the capillary plastometer is represented.

As is obvious from the diagrammatic representation, substantial improvements have been obtained as compared with the control product 4,4'-thio-bis-(3-methyl-6-t-butylphenol) 1 and the condensation product 2 of German Offenlegungsschrift No. 1,793,192. Already the melt viscosities of the starting granules are higher for the condensation products 3 and 4 according to the invention than for the control stabilizers 1 and 2. This fact suggests a lower degree of cross linking of the polyethylene powder charged during granulation. Moreover, the reduction in melt viscosity found when extruding the test specimen repeatedly in the capillary plastometer (ΔMFI 190/5) is markedly lower than that of the control stabilizers. This favorable behavior of the stabilizers according to the invention can be attributed to the increased molecular weight and the substantially lower migration rate attented therewith.

What is claimed is:

1. A 4,4'-thio-bis-(dialkylphenol)/formaldehyde condensation product having a molecular weight of 1,000 to 4,000.

2. A phenol/formaldehyde condensation product having a repeating unit of the formula

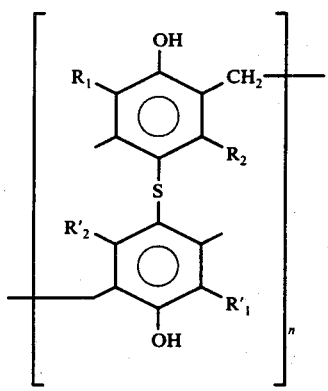

wherein $n$ is 3 to 12, $R_1$ and $R'_1$ are each independently selected from the group consisting of straight chained alkyl of 1–8 carbon atoms, branched chained alkyl of 1–8 carbon atoms, $R_2$ and $R'_2$ are each independently hydrogen, straight chained alkyl of 1–8 carbon atoms, and branched chained alkyl of 1–8 carbon atoms.

3. A phenol/formaldehyde condensation product having a repeating unit of the formula

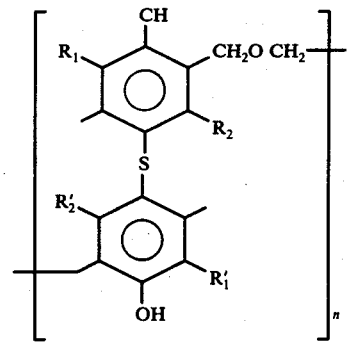

wherein $n$ is 3 to 12, $R_1$ and $R'_1$ are each independently selected from the group consisting of straight chained alkyl of 1–8 carbon atoms, branched chained alkyl of 1–8 carbon atoms, $R_2$ and $R'_2$ are each independently hydrogen, straight chained alkyl of 1–8 carbon atoms or branched chained alkyl of 1–8 carbon atoms.

4. A phenol/formaldehyde condensation product according to claim 2 having a molecular weight of 1,000 to 4,000.

5. A phenol/formaldehyde condensation product according to claim 3 having a molecular weight of 1,000 to 4,000.

6. A process for preparing a condensation product of 4,4'-thio-bis-(dialkylphenol) and formaldehyde which comprises contacting a 4,4'-thio-bis-(dialkylphenol) having a free hydrogen atom in the ortho position with respect to each phenolic hydroxyl group and a source of formaldehyde in the presence of a protonic acid catalyst, the mol ratio of said 4,4'-thio-bis-(dialkylphenol) to formaldehyde being 1:0.5 to 10 and the mol ratio of said 4,4'-thio-bis-(dialkylphenol) to said protonic acid being 1:0.01 to 10.

7. In a process for preparing a phenol/formaldehyde condensation process wherein a source of formaldehyde is condensed with a bisphenol in the presence of a protonic acid catalyst, the improvement which comprises employing as said bisphenol a compound of the formula

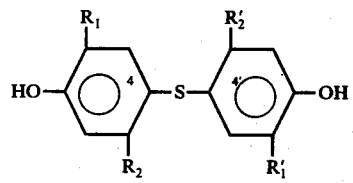

wherein $R_1$ and $R'_1$ are independently branched chained alkyl groups having up to 8 carbon atoms and $R_2$ and $R'_2$ are hydrogen, straight chained alkyl of 1 to 8 carbon atoms or branched chained alkyl having 1 to 8 carbon atoms, the mol ratio of said 4,4'-thio-bis-(dialkylphenol) to said formaldehyde being 1:0.5 to 10 and the mol ratio of said 4,4'-thio-bis-(dialkylphenol) to protonic acid being 1:0.01 to 10.

8. A process according to claim 6 wherein the 4,4'-thio-bis-(dialkylphenol) is 4,4'-thio-bis-(3-methyl-6-t-butylphenol) and the source of formaldehyde is formaldehyde.

9. A process according to claim 8 when the formaldehyde is present in the form of an aqueous solution.

10. A process according to claim 6 wherein the mole ratio of 4,4'-thio-bis-(dialkylphenol) to formaldehyde is 1:0.8 to 3.0.

11. A process according to claim 6 wherein the condensation is carried out in an aliphatic, cycloaliphatic or aromatic hydrocarbon having a boiling point of 80° to 150° C in which said 4,4'-thio-bis-(dialkylphenol) and said source of formaldehyde are soluble.

12. A process according to claim 6 wherein said protonic acid catalyst is selected from the group consisting of hydrochloric acid, phosphoric acid, p-toluene sulfonic acid, a mixture of hydrochloric and oxalic acid, a mixture of hydrochloric and sulfuric acid and a mixture of hydrochloric and boric acid.

13. A process according to claim 11 wherein said solvent is benzene.

* * * * *